United States Patent Office 3,676,036
Patented July 11, 1972

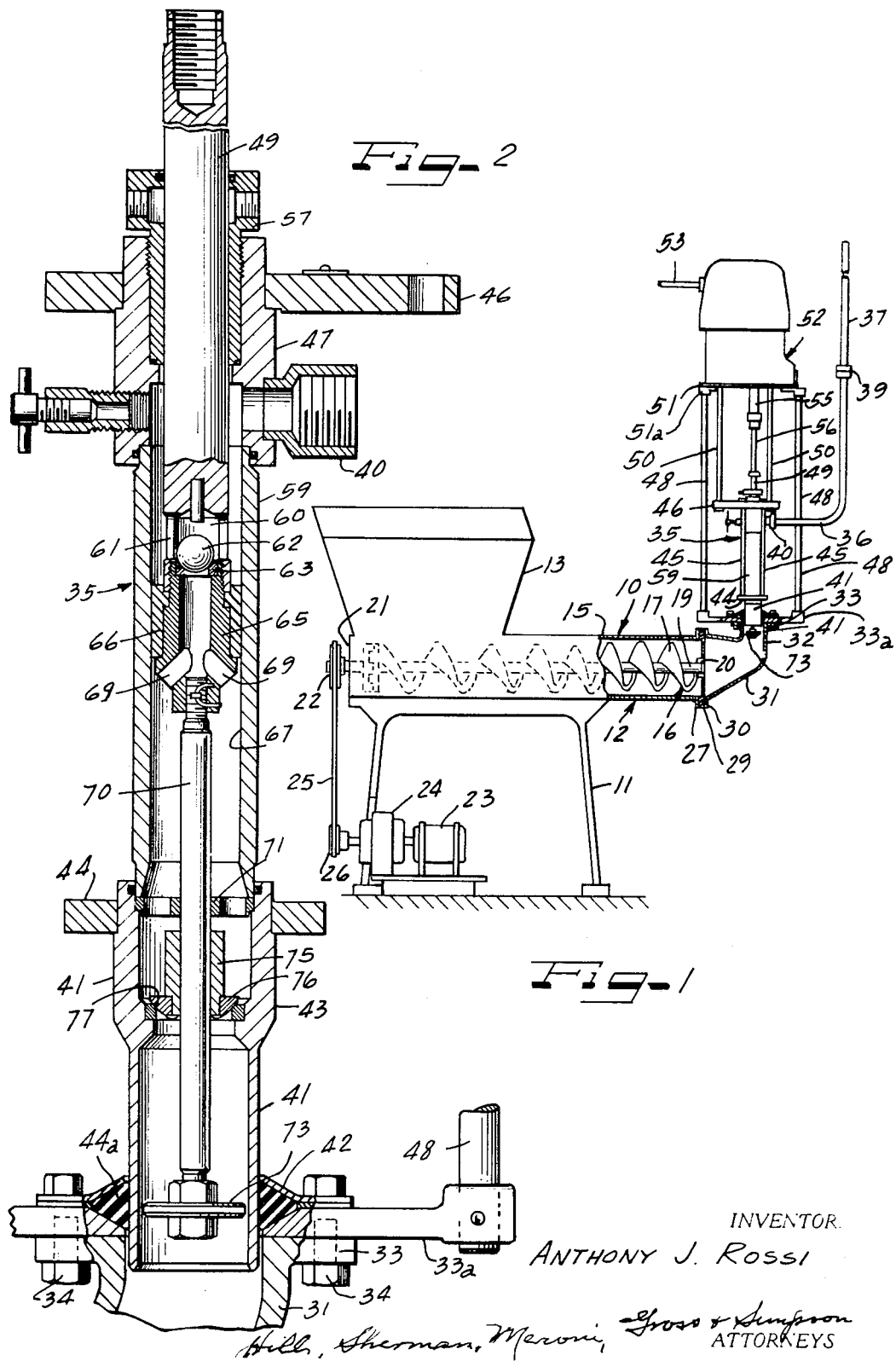

3,676,036
APPARATUS FOR EXTRUDING CANDY FILLINGS HAVING A HIGH PERCENTAGE OF SOLIDS
Anthony J. Rossi, 40 Kashey St., Clifton, N.J. 07043
Original application Apr. 25, 1968, Ser. No. 724,120, now Patent No. 3,556,021, dated Jan. 19, 1971. Divided and this application May 4, 1970, Ser. No. 46,588
Int. Cl. A21c 11/16
U.S. Cl. 425—209      5 Claims

ABSTRACT OF THE DISCLOSURE

Apparatus for extruding high solid content candy fillings to size in which the candy filling is deposited into the hopper of a worm type extruder and is reduced and pressurized by this extruder and is then picked up by a high pressure high viscosity piston pump in communication with a reducer, and ejected by the piston pump under high pressure to the final size of the filling. A Teflon lined high pressure hose is connected with the discharge end of the pump. A heavy duty pipe is connected with the discharge end of the hose, and may be formed at its discharge end to shape the filling to a desired size.

This application is a division of my application Ser. No. 724,120, filed Apr. 25, 1968, which issued as Pat. No. 3,556,021 on Jan. 19, 1971.

BACKGROUND OF THE INVENTION

Heretofore candy fillings have been extruded by injecting the fillings along a duct. These extruders and injectors, however, will only handle jelly types of fillings and will not handle fillings having a consistency of over 75% to 78% solids. Where the filling is a caramel filling or a like type of filling having a consistency of from 92% to 98% solids, the practice has been to roll the filling by hand to a size of from 6 to 8 inches in diameter and to then dump the filling into a batch roller, having tapered rotating rolls which spin the filling to the size required to be fed into the filling equipment, enclosing the filling in an outer jacket of hard candy. These operations of forming the filling are primarily hand operations requiring a great deal of manual labor and are time consuming and are not conducive to the mechanical production of filled candies.

SUMMARY AND OBJECTS OF THE INVENTION

The present invention provides an apparatus for producing candy fillings having a high percentage of solids by placing the mixed filling into a hopper and extruding the filling under pressure through a reducer fitting, and by then picking up the pressurized filling by the pick up scoop of a high pressure reciprocating pump further pressurizing the filling to a high pressure and ejecting the pressurized filling to a preselected size, at a temperature at which it will retain its shape, into a hard candy jacket.

A principal object of the present invention is to improve upon the apparatus for making high solid content candy fillings by extruding the filling to size in a series of successive and continuous high pressure extruding operations.

Another object of the invention is to provide an improved apparatus for extruding high solid content candy fillings to size, arranged with a view toward obtaining the pressure to extrude high solid content fillings in a series of two step continuous pressurized reducing operations.

These and other objects of the invention will appear from time to time as the following specification proceeds and with reference to the accompanying drawings wherein:

FIG. 1 is a diagrammatic view in side elevation of an extruding apparatus constructed in accordance with the principles of the present invention; and FIG. 2 is a vertical sectional view taken through the pick up end of a high pressure pump of a type that may be used to pressurize and feed the filling into an outer candy coating or jacket.

DESCRIPTION OF PREFERRED EMBODIMENT OF INVENTION

In the embodiment of the invention diagrammatically illustrated in the drawing, I have shown in FIG. 1, a high solid content filling extruder and injector 10 including a frame 11 supporting a worm type extruder 12 in spaced relation with respect to the ground.

The worm type extruder 12 includes a hopper 13 at the receiving end thereof into which the filling is deposited and a closed conduit 15 leading therefrom, generally conforming to the form of a worm 16. The worm 16 is shown as being in the form of a scroll 17 on a shaft 19 rotatably mounted at the discharge end of the conduit in a bearing support 20. The opposite end of the shaft 19 extends through a rear end wall 21 of the hopper 13 and is suitably journalled in said rear end wall. A pulley 22 on the outer end of said shaft is driven from a motor 23 and speed reducer 24. A belt 25 trained about a speed reducer drive pulley 26 has driving engagement with the pulley 22, for driving the shaft 19.

The conduit 15 has a radially outwardly extending flange 27 at its discharge end, abutted by a ring 29 forming a support for the bearing support 20. The ring 29 in turn is abutted by a flange 30 of an adapter filling or reducer 31. The flange 30 and ring 29 and flange 27 are connected together by bolts (not shown) or any other suitable securing means, and may be sealed in a conventional manner.

The reducer 31 is herein shown as being in the form of an elbow having a right angled upwardly extending discharge end 32 having a flange 33 extending thereabout. The fitting 31 need not necessarily be an elbow or reducer, but may be a straight adapter fitting. The flange 33 forms a mounting for a high pressure reciprocating pump 35. The pump 35 is herein shown as being an air operated pump of a type manufactured by Gray Company, Inc., Minneapolis, Minn. and is no part of the present invention, except insofar as it forms a pick up and pressurizing means for the extruded high solid content filling, for injecting the filling through a high pressure hose 36 connected at its discharge end with an extra heavy relatively long pipe 37, through a high pressure coupling 39. The high pressure hose 36 is shown as being connected with an outlet 40 from the pump and is preferably Teflon lined and constructed to stand pressures of 2000 p.s.i. and over. The extra heavy pipe 37 and coupling 39 are constructed to stand similar pressures and may be sized to effect the injection of a filling to size. The discharge end of the pipe 37 may also be shaped in any suitable manner to form the filling to a desired shape. In the present instance, the hose 36 and pipe 37 are between 15' and 20' long and usually extend horizontally or at an angle inclined with respect to the horizontal, although the length may be varied for various fillings and conditions.

The pump 35 includes a generally cylindrical intake housing 41 having open ends and having a bracket 44 extending radially of its upper end portion. Rods 45 extending through the bracket 44, support a bracket plate 46 on the top of a cylindrical guide and housing portion 47 for a connecting rod 49 for the pump and connected rod 49 for the pump and connected at its upper end to the piston (not shown) of an air motor 52. Rods 50 mounted on and extending upwardly of the bracket plate 46 have supporting connections with a bracket plate 51 for the air motor 52. The bracket plate 51 is also supported on a bracket 51$^a$ engaging the undersurface thereof and extending radially outwardly therefrom. The bracket 51$^a$ is supported on the upper ends of rods 48 extending upwardly of an annular bracket 33$^a$ supported on the flange 33 and secured thereto, as by machine screws 34.

The inner upper face of the annular bracket 33$^a$ is beveled to receive a grommet seal 44$^a$, retained thereto as by an annular retainer 42.

The air motor 52 is of a reciprocating type including a piston (not shown), reciprocably moved by air supplied to the motor through an air inlet 53. The piston (not shown) has a piston rod 55 depending therefrom connected with the connecting rod 49 through a coupling link 56.

As shown in FIG. 2, the connecting rod 49 is reciprocably guided in the cylindrical housing and guide 47 in a bearing and packing member 57 and depends therefrom along the housing 47 into a cylinder 59, connected between the housing 47 and the upper end portion of the intake housing 41. The connecting rod 49 has a hollow lower end portion 60 having openings 61 leading through the wall thereof, and forming a cage for a ball type valve 62. The valve 62 is seated on a valve seat 63 on the upper end portion of a hollow body 65 for a piston 66 reciprocably moved along an internal cylindrical wall 67 of the cylinder 59 upon reciprocable movement of the piston rod 55. Ports 69 lead from the bottom of the piston body 65 into the hollow interior portion of said piston body.

The piston body 65 in turn has a rod 70 threaded therein and depending therefrom through a guide 71 in the upper end portion of the housing 41. A pick up scoop or plate 73 is suitably mounted on the lower end of the rod 70 and is moved by the piston of the air pump 52 beneath the discharge end of the housing 41 to pick up the pressurized high solid content filling in the reducer 31 forced thereto by the worm 16, and lift and pressurize said filling upwardly through the housing 41 and along the cylindrical wall 67 of the cylinder 59. A sleeve 75 is slidably mounted on the rod 70 beneath the guide 71, and has a valve 76 on its lower end, seating against a valve seat 77 in the housing 41 upon the downstroke of the piston 66. The guide 71 for the rod 70 also forms a stop to limit upward movement of the valve 76.

The pump 35 is of a type in which air under pressure may be admitted to the inlet 53 to reciprocably move the piston 66 along the cylindrical wall 67 of the cylinder 59 and force the filling to move along said cylinder and pressurize the filling at pressures of at least 20 times the pressure of the air entering the inlet 53. In the present apparatus and process, it is desirable that the filling be pressurized at pressures in the order of 2000 p.s.i., although the pressures may be increased where required, dependent upon percentage of solids in the filling and the pressures required to extrude the filling through the hose 36 and pipe 37. The pressures, of course, are also dependent upon the diameter of the hose 36 and pipe 37.

In carrying out the process of the present invention, a mixed candy filling of a high solid content which usually contains from 92% to 98% solids is supplied to the hopper 13. Assuming the motor 23 is in operation and is rotatably driving the worm 16, the filling in the hopper 13 is fed and extruded by the worm 16 along the cylindrical conduit 15 and reducer fitting 31 and is forced under pressure along the reducer 31 to be picked up by the scoop 73 on the end of the rod 70, of the high pressure pump 35. The scoop 73, picking up the candy filling forced thereto by the worm 16, forces the filling upwardly along the housing 41 and interior cylindrical wall of the cylinder 59 on the upstroke of the piston 66. The continuous picking up of the high solid content filling by the scoop 73 will pressurize and advance the filling along the interior portion of the piston body 65 past the check valve 62 and out through the outlet 40 along the high pressure hose 36 and heavy duty pipe 37. The pump 35 pressurizing the filling to pressures of the order of at least 2000 p.s.i. forces the filling through the hose 36 and pipe 37 and raises the temperature of the filling from 125° to 140° F., at which temperature and consistency, the product will retain its shape on being discharged from the end of the heavy duty pipe 37. The filling may then be injected into a candy coating or may be coated in any conventional manner.

It may be see from the foregoing that a simple apparatus has been provided for mechanically extruding high solid content fillings to size, in which the extruding is attained by first extruding and pressurizing the filling along a fitting and forcing the filling to the pick up scoop of a high pressure reciprocating pump, pressurizing and extruding the filling at a relatively high pressure and effecting the shaping of the filling to a desired size.

It should also be understood that various forms of extruders and pumps may be used to carry out the process of the invention, arranged to pressurize the filling in low and high pressure stages, with an adapter or reducer between the stages.

While I have herein shown and described one form in which the invention may be embodied, it may readily be understood that various variations and modifications in the invention may be attained without departing from the spirit and scope of the novel concepts thereof.

I claim as my invention:

1. An apparatus for extruding candy fillings to size comprising,
   an extruder including a frame having a hopper at one end thereof,
   a closed conduit leading from said hopper,
   a worm extending along said hopper and closed conduit,
   an adapter fitting at the end of said hopper having a reduced diameter discharge end,
   means driving said worm to extrude the filling along said conduit and fitting,
   a pump in communication with the reduced discharge end of said fitting having an intake picking up the pressurized filling forced thereto along said fitting, and having an outlet spaced from said inlet, and
   said pump being a high pressure pump, pressurizing the high solid content filling and ejecting the filling through said outlet to be formed to size.

2. A candy filling extruder in accordance with claim 1, wherein the pump has a pick up scoop in the intake moving from said intake into said fitting,
   wherein a conduit leads from said outlet and has a non-expansible discharge end forming the pressurized filling to a preselected size.

3. A candy filling extruder in accordance with claim 2, wherein the pump pressurizes the candy filling at pressures in the order of 2000 p.s.i.

4. A candy filling extruder in accordance with claim 2, wherein the extruder conduit includes a high pressure flexible conduit connected to the discharge end of said pump and lined with Teflon and a relatively long non-expansible conduit leading therefrom.

5. A candy filling extruder in accordance with claim 1, wherein the fitting is in the form of an elbow having an upwardly facing discharge end,
wherein the intake extends downwardly into said elbow, and
wherein the pump includes a reciprocably movable rod having a pick up scoop on the lower end thereof, moving downwardly into said elbow and picking up the filling forced thereto by said worm.

References Cited

UNITED STATES PATENTS

| | | | |
|---|---|---|---|
| 3,225,715 | 12/1965 | Page | 107—14 R X |
| 3,381,072 | 4/1968 | Mutton et al. | 107—14 A X |
| 3,581,655 | 6/1971 | Hausmann | 107—14 B X |

JORDAN FRANKLIN, Primary Examiner

G. V. LARKIN, Assistant Examiner

U.S. Cl. X.R.

99—450.7